United States Patent [19]

Muggli et al.

[11] Patent Number: 4,547,675

[45] Date of Patent: Oct. 15, 1985

[54] SMOKE DETECTOR OPERATING ACCORDING TO THE RADIATION EXTINCTION PRINCIPLE

[75] Inventors: Jürg Muggli; Martin Labhart, both of Männedorf, Switzerland

[73] Assignee: Cerberus AG, Männedorf, Switzerland

[21] Appl. No.: 328,403

[22] Filed: Dec. 7, 1981

[30] Foreign Application Priority Data

Dec. 18, 1980 [CH] Switzerland ........................ 9342/80

[51] Int. Cl.[4] .............................................. G01N 21/00

[52] U.S. Cl. .................................... 250/565; 250/575; 356/438

[58] Field of Search ............... 250/573, 574, 575, 226, 250/227, 231 R, 564, 565; 356/437, 438, 439, 337, 338, 320; 340/630

[56] References Cited

U.S. PATENT DOCUMENTS

| | | | |
|---|---|---|---|
| 3,521,958 | 7/1970 | Treharne | 250/226 |
| 3,843,258 | 10/1974 | Shupe | 250/575 |
| 4,057,734 | 11/1977 | Barringer | 250/575 |
| 4,076,425 | 2/1978 | Saltz | 250/575 |

*Primary Examiner*—David C. Nelms
*Attorney, Agent, or Firm*—Werner W. Kleeman

[57] ABSTRACT

A smoke detector contains two radiation transmitters and two radiation receivers. Each of the radiation transmitters emits in a different spectral region, for instance, one emits above and the other one below 600 nm. One part of the radiation of both radiation transmitters is conducted via a measuring path, which is accessible to smoke, to one of the receivers constituting a measuring radiation receiver, and another part of such radiation is conducted via a comparison path, which is not accessible to smoke, to the other of the receivers constituting a comparison radiation receiver. Connected to both radiation receivers is an evaluation circuit which forms from the measuring radiation intensities prevailing in the two spectral regions and from the comparison radiation intensities prevailing in the same spectral regions a function of the type:

$$A = a\frac{I_R}{I_{RV}} - b\frac{I_G}{I_{GV}},$$

By suitably adjusting or selecting the components of the evaluation circuit, the coefficients a and b are selected such that in the absence of smoke in the measuring path, A becomes zero and in the presence of smoke such is proportional to the smoke density.

58 Claims, 9 Drawing Figures

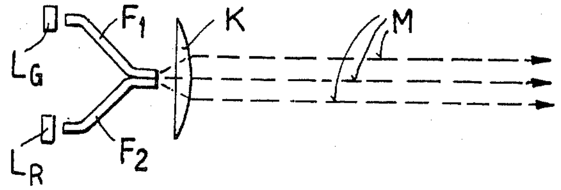
Fig. 5
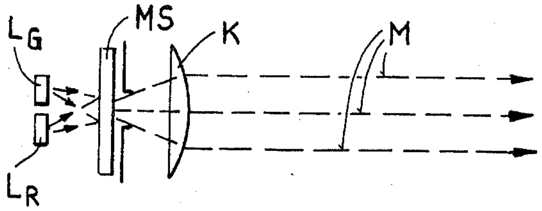
Fig. 6
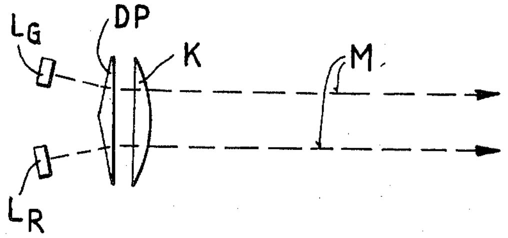
Fig. 7
Fig. 8
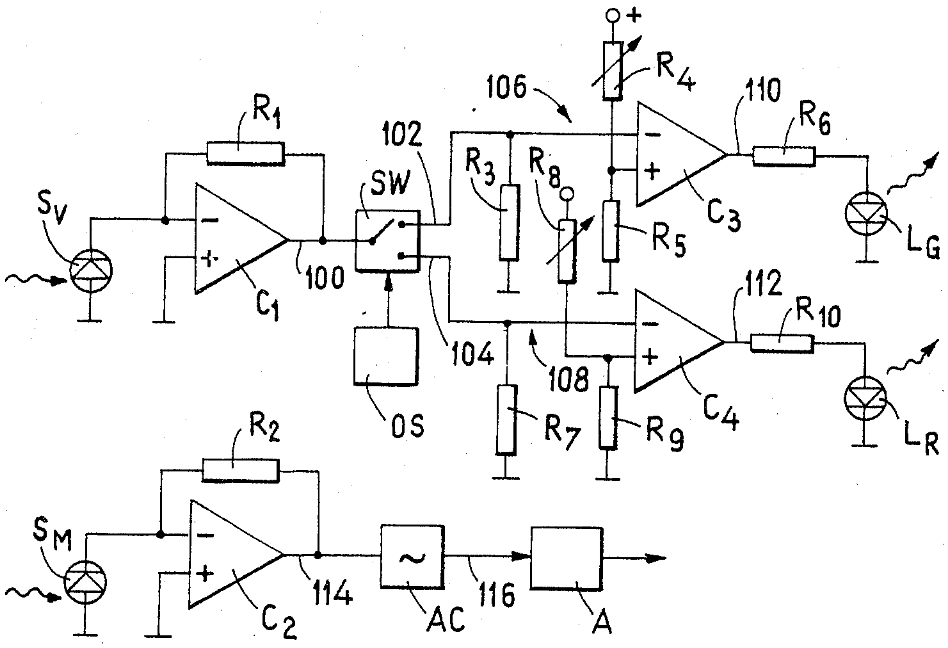

SMOKE DETECTOR OPERATING ACCORDING TO THE RADIATION EXTINCTION PRINCIPLE

BACKGROUND OF THE INVENTION

The present invention relates to a new and improved construction of smoke detector operating according to the radiation extinction principle, wherein there is detected the radiation attenuation caused by smoke present in a measuring path and there is triggered, at a given radiation attenuation, an alarm signal by means of an evaluation circuit.

With a smoke detector of this type there must be detected a relatively small decrease of the radiation which is directed by a radiation transmitter upon a radiation receiver. In this regard, it is a disadvantage that a similar effect as caused by the presence of smoke in the measuring path equally can be caused, for instance, by aging of the radiation source, dust contamination of optically effective surfaces or the temperature characteristics of the radiation transmitters and receivers. Thus, a spurious alarm signal can be triggered even without the presence of smoke, or else the smoke detector becomes insensitive and thus useless.

According to U.S. Pat. No. 3,994,603, granted Nov. 30, 1976, this shortcoming can be eliminated in that there is provided a comparison radiation beam, which is not or less influenced by smoke. By means of a comparison radiation receiver the evaluation circuit compensates for changes in radiation which are not caused by smoke.

While the aforementioned disadvantages thus can be extensively avoided, it is however not possible to reliably distinguish in this manner smoke from other types of suspended particles, such as dust particles or fog.

SUMMARY OF THE INVENTION

Therefore, it is a primary object of the present invention to provide a new and improved construction of smoke detector operating according to the radiation extinction principle which is not associated with the aforementioned limitations and drawbacks of the state of the art constructions.

Another important object of the present invention is to provide a smoke detector of the aforementioned type which is relatively insensitive to temperature fluctuations, dust contamination or dew, aging of the components or other slow changes in its properties or characteristics.

A further important object of the present invention aims at providing a smoke detector of the aforementioned type which has an improved long-term stability and works in an essentially trouble-free and functionally reliable manner.

It is yet another important object of the present invention to provide a smoke detector of the aforementioned type which is capable of differentiating more reliably between smoke and other types of particles and is less prone to giving of a false alarm.

Now in order to implement these objects and others which will become more readily apparent as the description proceeds, the invention contemplates providing a radiation transmitter for emitting radiation in a longer wave spectral region and a radiation transmitter for emitting radiation in a shorter wave spectral region. According to the invention, there are further provided a measuring radiation receiver for receiving the radiation of the two radiation transmitters after the same has passed through a smoke-accessible measuring path, and a comparison radiation receiver for receiving the radiation of the two radiation transmitters after the same has passed through a comparison path which is not or less accessible to smoke.

BRIEF DESCRIPTION OF THE DRAWINGS

The invention will be better understood and objects other than those set forth above will become apparent when consideration is given to the following detailed description thereof. Such description makes reference to the annexed drawings which illustrate exemplary embodiments of the invention and wherein:

FIG. 5 illustrates a smoke detector arrangement provided with radiation conductors or guides arranged forwardly of the measuring path;

FIG. 6 illustrates a smoke detector arrangement equipped with a ground glass plate;

FIG. 7 illustrates a smoke detector arrangement provided with a ridge prism; and FIGS. 8 and 9 respectively illustrate an evaluation circuit for a smoke detector.

DETAILED DESCRIPTION OF THE PREFERRED EMBODIMENTS

Figure 1:
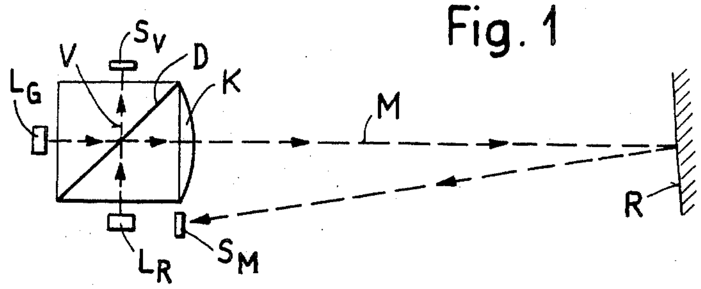
FIG. 1 is a smoke detector arrangement provided with a reflector.

Describing now the drawings, in the smoke detector arrangement illustrated in FIG. 1, by way of example and not limitation, two radiation transmitters $L_R$ and $L_G$, emitting radiation in different spectral regions, are arranged such that their main directions of radiation intersect at an angle of about 90°. At an angle of 45° with respect to the two directions of radiation there is arranged a semi-permeable or semi-transmissive mirror D. In the direct direction of radiation of the one radiation transmitter $L_R$ there is arranged a comparison radiation receiver $S_V$. In the direction of radiation of the other radiation transmitter $L_G$ there extends a smoke-accessible measuring path M with a length, for instance, of 10–20 cm. At the end of the measuring path M there is arranged a radiation reflector R which reflects the radiation passing through the measuring path M so that it impinges upon a measuring radiation receiver $S_M$.

By means of this arrangement both the radiation of the radiation transmitter $L_R$, which is deflected by the semi-transmissive or partially reflecting mirror D, and the part of the radiation of the other radiation transmitter $L_G$ which is transmitted by the mirror D through the measuring path M, are reflected by the reflector R and received by the measuring radiation receiver $S_M$. On the other hand, the direct radiation emanating from the radiation transmitter $L_R$ and passing through the semi-transmissive mirror D, and the radiation emanating from the other radiation transmitter $L_G$ and deflected by the semi-transmissive mirror D both impinge upon the comparison radiation receiver $S_V$ after passing through a comparison path V. This comparison path V is not or less accessible to smoke than the measuring path M. This construction and arrangement insures that in the absence of smoke the two radiation receivers $S_M$ and $S_V$ are almost equally impinged by radiation, whereas in the presence of smoke in the measuring path M they are impinged in a markedly different manner. This is because smoke absorbs longer wave radiation to a higher degree than shorter wave radiation.

As mentioned, the radiation transmitters $L_R$ and $L_G$ are constructed such that they emit radiation in mutually different wavelength regions. It has been found beneficial to construct one radiation transmitter so that it preferably emits radiation of a wavelength below 600 nm, preferably in the region of green light, while the other radiation transmitter produces or emits radiation of more than 600 nm wavelength, preferably red light or infrared radiation. The wavelength regions also can be chosen such that their mean values are spaced from one another by at least 50 nm. By selecting the wavelength regions there can be exploited the different extinction characteristics of various suspended particles for the purpose of distinguishing them from smoke. This is so because it has been found that the difference in extinction in the two aforementioned spectral regions has a characteristic value for various types of particles. If, as will be more fully described hereinafter, the evaluation circuit connected to the two radiation receivers $S_M$ and $S_V$ is tuned to this difference in extinction, there can be achieved the beneficial result that smoke particles will produce an especially strong output signal, while other types of particles, such as dust, dew or fog droplets, exhibit a considerably weaker influence. Thus, the triggering or release of an alarm signal essentially is caused by smoke but not by other types of particles.

As the radiation sources, here the transmitters $L_R$ and $L_G$, there can be used wideband radiating devices, for instance incandescent lamps which are provided with appropriate forwardly arranged color filters. It has been found particularly beneficial to employ light-emitting diodes (LED's) which are structured for the emission of radiation in certain wavelength regions. For focusing the radiation at the measuring path M it is recommendable to use a collimator lens K in order to avoid radiation losses. However, such collimator lens K is unnecessary if the radiation sources are constructed as laser diodes. The two radiation receivers $S_V$ and $S_M$ beneficially are matched or tuned to the radiation of the two radiation transmitters $L_G$ and $L_R$, i.e. they advantageously are constructed such as to be sensitive to the spectral regions of both radiation transmitters $L_G$ and $L_R$.

The splitting or dividing ratio of the semi-permeable or semi-transmissive mirror D can, but need not be 1:1. If there are used radiation transmitters $L_R$ and $L_G$ having markedly different intensities or radiation receivers $S_M$ and $S_V$ having markedly different sensitivies, then it is beneficial to select a different splitting or dividing ratio, if necessary up to 50:1, so that upon irradiation of the two radiation receivers $S_M$ and $S_V$ they give the same output signal in both spectral regions.

Instead of using a single reflector R there also can be used a number of reflector elements, by means of which the measuring path is multiply folded, for instance in a star-shaped fashion, for instance as taught in German Pat. No. 2,856,259.

Figure 2:
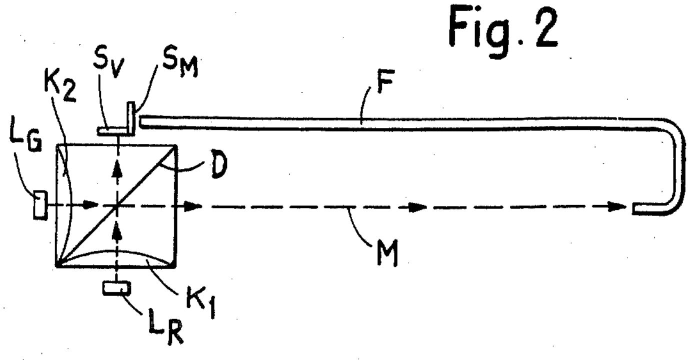
FIG. 2 is a smoke detector arrangement equipped with a radiation conductor arranged immediately after the measuring path.

FIG. 2 illustrates a modified construction of smoke detector arrangement. Here there is provided a separate collimator lens $K_1$ and $K_2$ for each of the two radiation transmitters $L_G$ and $L_R$. As opposed to the first embodiment described above, the radiation is not reflected after passing through the measuring path M, but is guided back to the measuring radiation receiver $S_M$ by means of a radiation conductor or guide F, for instance by using fibre optics. In this exemplary embodiment under discussion the measuring radiation receiver $S_M$ and the comparison radiation receiver $S_V$ can be arranged immediately neighboring one another, or according to a further construction of the invention can be structured as dual-radiation receivers. Consequently, the connection to the evaluation circuit is highly facilitated and there are achieved the same optical characteristics and the same temperature characteristics.

Figure 3:
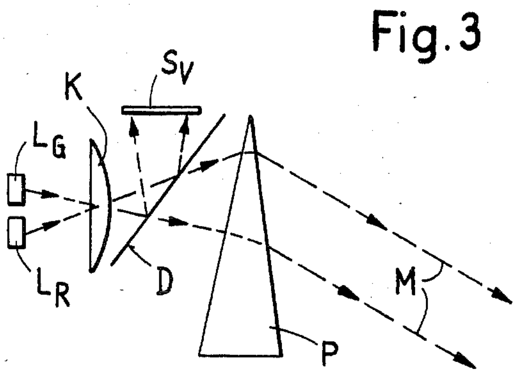
FIG. 3 illustrates a smoke detector arrangement provided with a dispersion prism.

FIG. 3 illustrates a smoke detector arrangement wherein the radiation transmitters $L_G$ and $L_R$ are arranged immediately neighboring one another. In order to achieve that with an arrangement of this type the radiation of both radiation transmitters $L_G$ and $L_R$ extend essentially parallel to each other, there is made use of the dispersion of a prism P. The radiation of the two radiation transmitters $L_R$ and $L_G$ initially is aligned by a collimator K and then passes through the common prism P. Since light of longer wavelength is refracted less than light of shorter wavelength, the angle of the primary or main directions of radiation is thus compensated and both radiation beams M depart from the prism P essentially mutually parallel to one another. Thus, there is ensured that for both wavelengths or spectral regions the measuring radiation paths extensively coincide and are subject to the same influences. Consequently, the comparison radiation can be removed at a suitable location either before or after the prism P.

Figure 4:
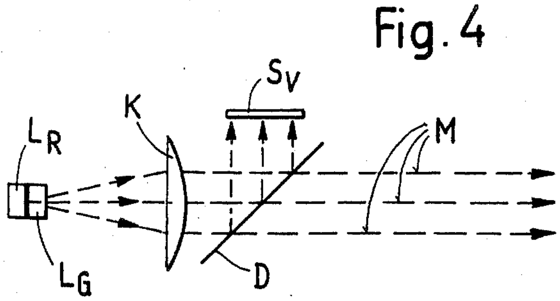
FIG. 4 depicts a smoke detector arrangement provided with successively arranged radiation transmitters.

FIG. 4 illustrates a further embodiment of smoke detector arrangement with coordinated measuring radiation M in both spectral regions. In the present example, this coordinated measuring radiation M is attained in that the two radiation sources $L_R$ and $L_G$ are coaxially arranged in succession or tandem. Hence, for instance an LED-chip $L_G$ emitting green light can be mounted, for instance, upon a chip $L_R$ emitting infrared radiation, so that the infrared radiation emanating from the latter irradiates the chip $L_G$ which emits green light. The two types of radiation are substantially parallely aligned by a collimator K and pass along essentially identical paths through the measuring path M. Arranged forwardly of or after the collimator K is a semi-transmissive or semi-permeable mirror D which conducts part of the radiation to comparison radiation receiver $S_V$. This guarantees for a complete compensation of all intensity fluctuations and misadjustments.

As illustrated in the variant arrangement of FIG. 5, the radiation emitted by the two radiation transmitters $L_G$ and $L_R$ also can be united for forming the measuring radiation M by means of radiation-conducting elements or guides $F_1$ and $F_2$, again by using fibre optics. A collimator K is arranged at the output side of these radiation conducting or guide elements $F_1$ and $F_2$.

According to the modified version of FIG. 6, the two radiation transmitters $L_G$ and $L_R$ equally can irradiate the same ground glass element MS or equivalent structure, and the radiation effluxing therefrom is conducted to the measuring path M by means of the collimator K.

In the construction depicted in FIG. 7, the radiation which is transmitted in slightly different directions by means of the radiation transmitters $L_G$ and $L_R$ also can be brought into alignment with the measuring path M by means of a ridge prism DP or equivalent structure. Furthermore, a more uniform illumination of the aperture can be achieved if instead of one ridge prism DP there is employed an entire array of suitable elements, such as a number of adjacently arranged or juxtapositioned, narrow ridge prisms (Fresnel lens).

If the two radiation transmitters are arranged behind one another then the light emanating therefrom can be united for passing through the measuring path M by using a bifocal Fresnel lens. Every second ring of this Fresnel lens images the one radiation transmitter at a point or spot, which also can be located for instance at infinity, while the other rings image the other radiation transmitter at the same point or spot. If the two radiation transmitters $L_G$ and $L_R$ are arranged adjacent to each other, then they can be imaged at the same point or spot by means of a substantially cylindrical bifocal Fresnel lens.

Moreover, a completely identical measuring path for both spectral regions can be obtained in that the two radiation transmitters $L_G$ and $L_R$ are combined into a spectrally variable radiation source, for instance an incandescent lamp provided with an optical filter which can be switched to two different spectral regions, or a variable light-emitting diode.

FIG. 8 illustrates a suitable construction of evaluation circuit which can be connected to the radiation receivers $S_M$ and $S_V$ and serves for the operation of the radiation transmitters $L_R$ and $L_G$.

In this circuit the comparison radiation receiver $S_V$ is connected to the inverting input of an operational amplifier $C_1$ of the commercially available type MC 34002, (available from Motorola Corporation), and the non-inverting input thereof is grounded. The output 100 of the operational amplifier $C_1$ is feedback coupled to the inverting input by means of a resistor or resistance $R_1$. The output of the operational amplifier $C_1$ is also connected to a controllable switch SW, for instance a FET-switch of the commercially available type MC 14066, which through the agency of an oscillator OS is periodically switched from one output position to the other. Each of the two outputs 102 and 104 of the switching arrangement or switch SW is connected to a respective driver channel 106 and 108 for the two radiation transmitters $L_G$ and $L_R$. The oscillator OS causes the two radiation transmitters $L_G$ and $L_R$ to alternatingly emit radiation, and specifically, either successively without any time intervals or with time intervals, i.e. in the form of alternating radiation pulses. In principle, both driver channels 106 and 108 can be identically constructed, or in consideration of the different characteristics of the radiation transmitters $L_G$ and $L_R$ at least in analogous manner. In the following description the analogous components are placed in parentheses. The two outputs 102 and 104 of the switching arrangement SW are connected to ground by means of a resistor $R_3$ ($R_7$) and at the same time they are connected to the inverting input of a related operational amplifier $C_3$ ($C_4$) of the commercially available type MC 34002, whose non-inverting input is located at the tap of a voltage divider $R_4$, $R_5$ ($R_8$, $R_9$). By means of a resistor $R_6$ ($R_{10}$) the corresponding output 110 and 112 of the operational amplifier $C_3$ ($C_4$) operates the related radiation transmitter $L_G$ ($L_R$). One of the resistors of the voltage divider, for instance the resistor $R_4$ ($R_8$), preferably is adjustable or exchangeable, so that there can be adjusted the regulating level for the intensity of the two radiation sources $L_G$ and $L_R$.

The circuit arrangement herein described enables automatically regulating to a certain intensity level the intensity of the two radiation transmitters $L_G$ and $L_R$ according to the intensity of the reference radiation received by the reference or comparison radiation receiver $S_V$. Thus, there is automatically compensated intensity fluctuations due to aging, temperature changes and similar effects.

The measuring radiation receiver $S_M$ equally is connected to the inverting input of an operational amplifier $C_2$ of the commercially available type MC 34002 (Motorola Corporation), whose non-inverting input again is grounded and whose output 114 is feedback coupled via a resistor $R_2$ to the inverting input. The output 114 of this operational amplifier $C_2$ is connected to an alternating-current voltage amplifier AC, at the output 116 of which there is located a suitable alarm circuit A.

Thus, the amplitude of the output signal which is generated by the alternating-current voltage amplifier AC and transmitted to the alarm circuit A is dependent in the following manner upon the radiation intensities $I_G$ and $I_R$ in both spectral regions received by the measuring radiation receiver $S_M$ and upon the reference radiation intensities $I_{RV}$ and $I_{GV}$, received in the same spectral regions by the reference radiation receiver $S_V$:

$$A = \left( a\frac{I_R}{I_{RV}} - b\frac{I_G}{I_{GV}} \right)$$

wherein a and b are factors which result from the characteristics of the components, especially in the voltage divider ratio $R_4/R_5$ ($R_8/R_9$). By suitably adjusting the resistor $R_4$ ($R_8$) there can be achieved the result that in the absence of smoke in the measuring path M the alternating-current signal A becomes zero. The output signal A thus becomes directly dependent upon the smoke density, and the alarm circuit can be structured such that an alarm signal is triggered or transmitted as soon as the output signal A exceeds a given threshold value. Since in this case the deviation from zero serves as a criterion for triggering an alarm signal, there are avoided right from the start the problems occurring with prior art smoke detectors operating according to the extinction principle, wherein there had to be determined a small deviation from a large value which was difficult to stabilize. It also is possible to form one of the magnitudes $$B = \left( a\frac{I_R}{I_{RV}} - b\frac{I_G}{I_{GV}} \right) \cdot \frac{I_{RV}}{I_R} \text{ or}$$

$$C = \left( a\frac{I_R}{I_{RV}} - b\frac{I_G}{I_{GV}} \right) \cdot \frac{I_{GV}}{I_G} \text{ or}$$

$$D = \left( a\frac{I_R}{I_{RV}} - b\frac{I_G}{I_{GV}} \right) / \left( \frac{I_R}{I_{RV}} + \frac{b}{a}\ \frac{I_G}{I_{GV}} \right)$$

and to evaluate the same as an alarm criterion. These magnitudes equally are a measure for the smoke density.

An alarm signal is triggered if one of the magnitudes A, B/a, C/b or 2D/a exceeds a value between 0.01 and 0.2, wherein the value 0.01 is governed by the stability of the smoke detector and 0.2 by the length of the measuring path. The factors a and b are selected such that $$a\frac{I_R}{I_{RV}} = 1 \text{ and } b\frac{I_G}{I_{GV}} = 1.$$

The circuit can be further constructed in that there are formed additional parameters, for instance:

$$E = \left(1 - c\frac{I_G}{I_{GV}}\right) / \left(1 - d\frac{I_R}{I_{RV}}\right) \text{ or}$$

$$F = 2\left(e\frac{I_R}{I_{RV}} - f\frac{I_G}{I_{GV}}\right) / \left(2 - e\frac{I_R}{I_{RV}} - f\frac{I_G}{I_{GV}}\right)$$

These parameters are a function of the type of smoke which is present and enables drawing certain assumptions or conclusions about the same.

It also is possible to form the parameters $$G = g\frac{I_G}{I_{GV}} \text{ or } H = h\frac{I_R}{I_{RV}}$$

which, in combination with the primary criteria A, B, C or D, equally can be used for altering the differences in the response behavior to various types of combustion processes. Furthermore, an additional evaluation of one of the magnitudes E, F, G, or H also can be employed for differentiating more clearly between smoke and spurious magnitudes, such as dust or dew.

The smoke development can be observed if, in addition, there is formed the timewise differential quotient dA/dt, dB/dt, dC/dt or dD/dt of the output signal A, B, C or D.

The stability of the smoke detector can be considerably increased if the small and slow changes of the output signal are suppressed and there are only evaluated the signals which are at least as fast as when caused by a fire or combustion process. This can be achieved either in that at least one of the factors a, b, c, d, e, f, g or h is slowly changed in order to compensate these changes or fluctuations, or in that the output signal is compared to its sliding mean value.

Figure 9:
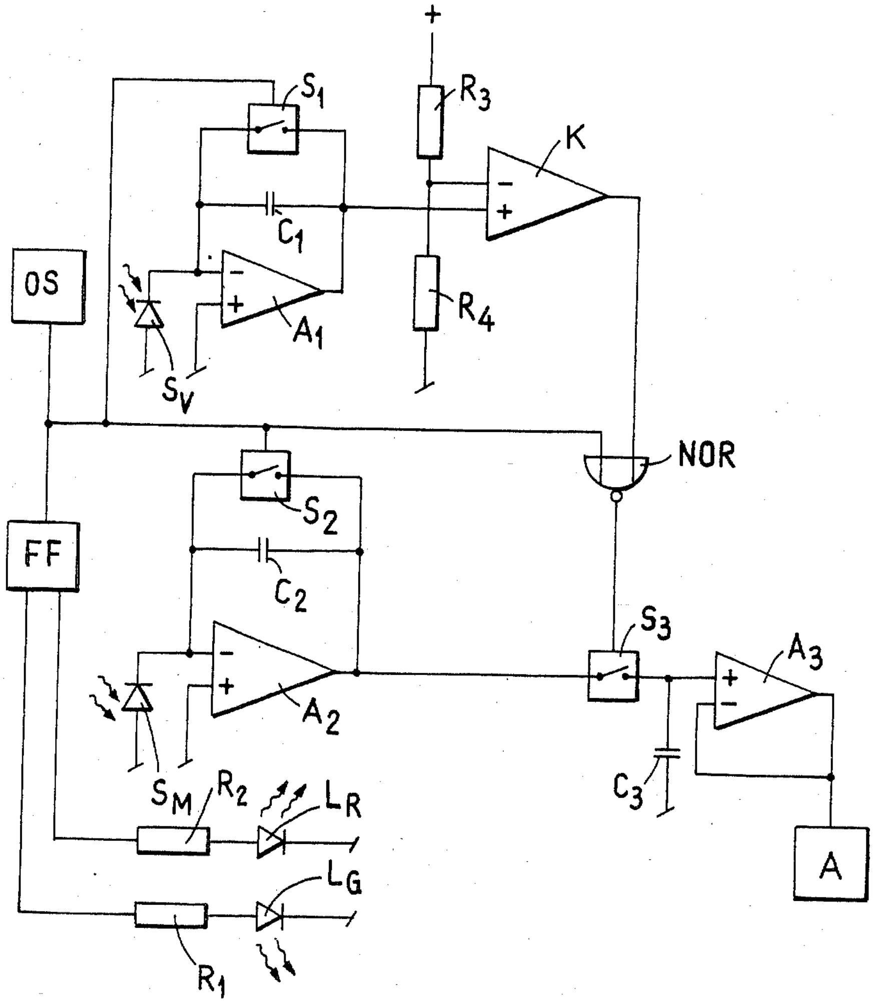

Another configuration of evaluation circuit is illustrated in FIG. 9. The signal of the measuring radiation receiver $S_M$ and the signal of the comparison radiation receiver $S_V$ are integrated as a function of time ($A_2$, $C_2$, $S_2$ and $A_1$, $C_1$, $S_1$, respectively). The comparator K compares the integral of the comparison radiation receiver $S_V$ with a predetermined value which is determined by the voltage divider $R_3$, $R_4$, and opens the switch $S_3$ of a sample-and-hold amplifier ($S_3$, $C_3$, $A_3$) at the moment when the integration value exceeds the predetermined value. At the output of the amplifier $A_3$ there is connected the alarm circuit A. The oscillator OS controls the repetition of the integration operation and by means of the flipflop FF switches-over between the two radiation transmitters $L_G$ and $L_R$.

The smoke detectors described herein possess considerably improved stability even over longer periods of time, work with improved functional reliability and are less prone to malfunction or disturbances. Changes which are caused by dust or changing characteristics of the components are automatically compensated without the danger of giving a false alarm and without a loss in sensitivity. In addition, by suitably selecting the spectral regions to be used, there can be achieved the beneficial result that the smoke detectors of the present development preferably respond to smoke particles, while not responding or hardly at all to other types of particles.

While there are shown and described present preferred embodiments of the invention, it is to be distinctly understood that the invention is not limited thereto, but may be otherwise variously embodied and practiced within the scope of the following claims.

Accordingly, what we claim is:

1. In a smoke detector operating according to the radiation extinction principle, wherein the radiation attenuation caused by smoke is detected in a measuring path and at a predetermined radiation attenuation there is triggered a signal by means of an evaluation circuit, the improvement which comprises:

a radiation transmitter for emitting radiation in a long wave spectral region;

a radiation transmitter for emitting radiation in a shorter wave spectral region;

means for providing a measuring path which is accessible to smoke;

means for providing a comparison path which is accessible to smoke at least to a relatively restricted degree;

a measuring radiation receiver for receiving the radiation of said two radiation transmitters after the same has passed through said measuring path which is at least relatively readily accessible to smoke; and a comparison radiation receiver for receiving the radiation of said two radiation transmitters after the same has passed through said comparison path which is accessible to smoke at least to a relatively restricted degree.

2. The smoke detector as defined in claim 1, wherein:

the evaluation circuit is constructed so that it forms an output signal;

said evaluation circuit forming said output signal in response to a portion of the radiation from said radiation transmitter for emitting radiation in a longer wave spectral region and from said radiation transmitter for emitting radiation in a shorter wave spectral region which has passed through said measuring path and in response to a portion of said radiation which has passed through said comparison path according to the function:

$$A = \left(a\frac{I_R}{I_{RV}} - b\frac{I_G}{I_{GV}}\right),$$

wherein:

A=said output signal;

a=a first predeterminate device coefficient of the evaluation circuit;

b=a second predeterminate device coefficient of the evaluation circuit;

$I_R$=intensity of said radiation received in said longer wave spectral region by said measuring radiation receiver;

$I_{RV}$=intensity of said radiation received in said longer wave spectral region by said comparison radiation receiver;

$I_G$=intensity of said radiation received in said shorter wave spectral region by said measuring radiation receiver; and $I_{GV}$=intensity of said radiation received in said shorter wave spectral region by said comparison radiation receiver.

3. The smoke detector as defined in claim 1, wherein:
said evaluation circuit is constructed such that it forms an output signal;
said evaluation circuit forming said output signal in response to a portion of the radiation from said radiation transmitter for emitting radiation in alonger wave spectral region and from said radiation transmitter for emitting radiation in a shorter wave spectral region which has passed through said measuring path and in response to a portion of said radiation which has passed through said comparison path according to the function:

$$B = \left( a\frac{I_R}{I_{RV}} - b\frac{I_G}{I_{GV}} \right) \cdot \frac{I_{RV}}{I_R},$$

wherein:
B=said output signal;
a=a first predeterminate device coefficient of the evaluation circuit;
b=a second predeterminate device coefficient of the evaluation circuit;
$I_R$=intensity of said radiation received in said longer wave spectral region by said measuring radiation receiver;
$I_{RV}$=intensity of said radiation received in said longer wave spectral region by said comparison radiation receiver;
$I_G$=intensity of said radiation received in said shorter wave spectral region by said measuring radiation receiver; and
$I_{GV}$=intensity of said radiation received in said shorter wave spectral region by said comparison radiation receiver.

4. The smoke detector as defined in claim 2 or 3, wherein:
the evaluation circuit contains predetermined circuit components connected to said comparison radiation receiver and selected such that in the absence of smoke in said meausring path said output signal is essentially zero.

5. The smoke detector as defined in claim 4, wherein:
said predetermined circuit components include at least one operational amplifier and at least two resistors conjointly connected to said at least one operational amplifier to define at least one voltage divider for adjusting at least one of said device coefficients.

6. The smoke detector as defined in claim 2 or 3, wherein:
said evaluation circuit is constructed such that in addition there is formed the magnitude:

$$E = \left(1 - c\frac{I_G}{I_{GV}}\right) / \left(1 - d\frac{I_R}{I_{RV}}\right),$$

wherein:
E=a parameter dependent upon the type of smoke present;
c=a third predeterminate device coefficient of the evaluation circuit; and
d=a fourth predeterminate device coefficient of the evaluation circuit.

7. The smoke detector as defined in claim 2 or 3, wherein:
said evaluation circuit is constructed such that in addition there is formed the magnitude:

$$G = g\frac{I_G}{I_{GV}},$$

wherein:
G=a parameter dependent upon the type of smoke present; and
g=a third predeterminate device coefficient of the evaluation circuit.

8. The smoke detector as defined in claim 2 or 3, wherein:
said evaluation circuit is constructed such that at least one of said first and second predetermined device coefficients a and b is gradually adjustable.

9. The smoke detector as defined in claim 6, wherein:
said evaluation circuit is constructed such that at least one of said predeterminate device coefficients a, b, c and d, is gradually adjustable.

10. The smoke detector as defined in claim 7, wherein:
said evaluation circuit is constructed such that at least one of said predeterminate device coefficients a, b, and g is gradually adjustable.

11. The smoke detector as defined in claim 2 or 3, wherein:
said evaluation circuit comprises circuit means for forming a means value of said output signal; and
said evaluation circuit is constructed for comparing said output signal to said means value thereof.

12. The smoke detector as defined in claim 6, wherein:
said evaluation circuit comprises circuit means for forming a means value of said output signal; and
said evaluation circuit is constructed for comparing said output signal to said mean value thereof.

13. The smoke detector as defined in claim 7, wherein:
said evaluation circuit comprises circuit means for forming a means value of said output signal; and
said evaluation circuit is constructed for comparing said output signal to said mean value thereof.

14. The smoke detector as defined in claim 2 or 3, wherein
said circuit being constructed so that there is additionally formed the time-differentiated quotient dA/dt or dB/dt, of the respective output signal A or B.

15. The smoke detector as defined in claim 1, further including:
a radiation divider; and
said radiation transmitters and said radiation receivers being arranged such that the radiation of one radiation transmitter arrives at the measuring radiation receiver upon deflection of said radiation divider, while arriving at the comparison radiation receiver upon passing through said radiation divider, whereas the radiation of the other radiation transmitter arrives at the measuring radiation receiver upon passing through said radiation divider, while arriving at the comparison radiation receiver upon reflection at said radiation divider.

16. The smoke detector as defined in claim 1, wherein:

said two radiation transmitters are arranged immediately adjacent one another.

17. The smoke detector as defined in claim 1, further including:

at least two radiation conductors arranged such that the radiation of said two radiation transmitters is conducted to immediately neighbouring locations.

18. The smoke detector as defined in claim 16 or 17, further including:

a ground glass plate;

said two radiation transmitters are arranged such that they irradiate said ground glass plate; and the radiation emanating from an irradiated surface of said ground glass plate being conducted to said measuring path.

19. The smoke detector as defined in claim 1, further including:

a ridge prism for uniting the radiation of said two radiation transmitters at the measuring path.

20. The smoke detector as defined in claim 1, further including:

a number of narrow adjacently arranged ridge prisms uniting the radiation of said two radiation transmitters at said measuring path.

21. The smoke detector as defined in claim 16 or 17, further including:

a prism for substantially parallely aligning the radiation of the two adjacently arranged radiation transmitters by means of its prism dispersion.

22. The smoke detector as defined in claim 16, wherein:

said two radiation transmitters are successively arranged in the direction of emission of the radiation; and the radiation of one radiation transmitter irradiating the other radiation transmitter.

23. The smoke detector as defined in claim 1, wherein: said two radiation transmitters are successively arranged in the direction of the radiation; and a bifocal Fresnel lens being provided for imaging the radiation of said two radiation transmitters onto the same image spot.

24. The smoke detector as defined in claim 1, wherein:

one of said two radiation transmitters emitting radiation having a wavelength greater than 600 nm; and the other one of said two radiation transmitters emitting radiation having a wavelength less than 600 nm.

25. The smoke detector as defined in claim 1, wherein:

said radiation transmitters are constructed such that mean values of the wavelength regions thereof are spaced from one another by at least 50 nm.

26. The smoke detector as defined in claim 1, wherein:

said radiation transmitters are constructed as light-emitting diodes.

27. The smoke detector as defined in claim 1, wherein:

said radiation transmitters are constructed as wide-band radiation sources provided with forwardly arranged optical filters.

28. The smoke detector as defined in claim 1, wherein:

said radiation transmitters are constructed as a wide-band radiation source provided with a forwardly arranged optical filter; and the transmission region of said optical filter being changeable by electrical signals.

29. The smoke detector as defined in claim 1, wherein:

said radiation transmitters are constructed as a wide-band radiation source;

an optical filter arranged forwardly of said radiation receivers; and the transmission region of said optical filter being changeable by means of electrical signals.

30. The smoke detector as defined in claim 1, wherein:

said radiation transmitters are constructed as a variable light-emitting diode (LED).

31. The smoke detector as defined in claim 1, further including:

at least one collimator optic means for collimating the radiation emanating from said radiation transmitters.

32. The smoke detector as defined in claim 1, wherein:

said radiation transmitters are constructed as laser diodes.

33. The smoke detector as defined in claim 1, further including:

at least one reflector arranged in said measuring path; and said reflector serving for reflecting the radiation of said two radiation transmitters onto said measuring radiation receiver.

34. The smoke detector as defined in claim 1, further including:

a radiation conductor for removing the radiation of said radiation transmitters after the same has passed through said measuring path and guiding it to said measuring radiation receiver.

35. The smoke detector as defined in claim 33, further including:

reflector elements arranged such that said measuring path has a substantially star-shaped configuration.

36. The smoke detector as defined in claim 1, wherein:

said measuring radiation receiver and said comparison radiation receiver are incorporated in a common housing to form a dual radiation-radiation receiver.

37. The smoke detector as defined in claim 1, wherein:

said evaluation circuit is structured such that it controls said radiation transmitters so that they emit continuous wave radiation in an alternating fashion.

38. The smoke detector as defined in claim 1, wherein:

said evaluation circuit is constructed such that said radiation transmitters alternatingly emit radiation trains.

39. The smoke detector as defined in claim 1, wherein:

said radiation measuring receiver generates an output signal containing an alternating component;

said evaluation circuit is constructed such that said alternating component of the output signal of said measuring radiation receiver serves as a criterion for giving an alarm signal.

40. The smoke detector as defined in claim 1, further including:

said evaluation circuit contains regulation means; and said regulation means regulating the radiation intensity of said two radiation transmitters in the corresponding wavelength region to a predetermined level as a function of the received comparison radiation.

41. The smoke detector as defined in claim 40, wherein:

the regulation level for the radiation is adjustable in the two wavelength regions.

42. The smoke detector as defined in claim 1, wherein:

said evaluation circuit is constructed such that the signal of at least one of the two radiation receivers is integrated as a function of time.

43. The smoke detector as defined in claim 1, wherein:

said evaluation circuit is constructed such that the signal of at least one of the two radiation receivers is integrated as a function of time to obtain an integration value; and said obtained integration value is evaluated at the moment when the integral of the signal of the comparison radiation receiver has reached a predetermined level.

44. The smoke detector as defined in claim 2, wherein:

said evaluation circuit is structured such that at an alarm point said output signal, lies between 0.01 and 0.2, wherein a and b are selected such that a $I_R/I_{RV}=1$ and b $I_G/I_{GV}=1$, when no smoke is present in said measuring path.

45. The smoke detector as defined in claim 1, wherein:

said evaluation circuit is constructed such that it forms an output signal;

said evaluation circuit forming said output signal in response to a portion of the radiation from said radiation transmitter for emitting radiation in a longer wave spectral region and from said radiation transmitter for emitting radiation in a shorter wave spectral region which has passed through said measuring path in response and to a portion of said radiation which has passed through said comparison path according to the function:

$$C = \left(a\frac{I_R}{I_{RV}} - b\frac{I_G}{I_{GV}}\right) \cdot \frac{I_{GV}}{I_G},$$

wherein:

C=said output signal;

a=a first predeterminate device coefficient of the evaluation circuit;

b=a second predeterminate device coefficient of the evaluation circuit;

$I_R$=intensity of said radiation received in said longer wave spectral region by said measuring radiation receiver;

$I_{RV}$=intensity of said radiation received in said longer wave spectral region by said comparison radiation receiver;

$I_G$=intensity of said radiation received in said shorter wave spectral region by said measuring radiation receiver; and $I_{GV}$=intensity of said radiation received in said shorter wave spectral region by said comparison radiation receiver.

46. The smoke detector as defined in claim 1, wherein:

said evaluation circuit is constructed such that it forms an output signal;

said evaluation circuit forming said output signal in response to a portion of the radiation from said radiation transmitter for emitting radiation in a longer wave spectral region and from radiation transmitter for emitting radiation in a shorter wave spectral region which has passed through said measuring path and in response to a portion of said radiation which has passed through said comparison path according to the function:

$$D = \left(a\frac{I_R}{I_{RV}} - b\frac{I_G}{I_{GV}}\right) / \left(\frac{I_R}{I_{RV}} + \frac{b}{a}\cdot\frac{I_G}{I_{GV}}\right),$$

wherein:

D=said output signal;

a=a first predeterminate device coefficient of the evaluation circuit;

b=a second predeterminate device coefficient of the evaluation circuit;

$I_R$=intensity of said radiation received in said longer wave spectral region by said measuring radiation receiver;

$I_{RV}$=intensity of said radiation received in said longer wave spectral region by said comparison radiation receiver;

$I_G$=intensity of said radiation received in said shorter wave spectral region by said measuring radiation receiver; and $I_{GV}$=intensity of said radiation received in said shorter wave spectral region by said comparison radiation receiver.

47. The smoke detector as defined in claim 2, wherein:

said evaluation circuit is constructed such that in addition there is formed the magnitude:

$$F = 2\left(e\frac{I_R}{I_{RV}} - f\frac{I_G}{I_{GV}}\right) / \left(2 - e\frac{I_R}{I_{RV}} - d\frac{I_G}{I_{GV}}\right),$$

wherein:

F=a parameter dependent upon the type of smoke present;

d=a third predeterminate device coefficient of the evaluation circuit;

e=a fourth predeterminate device coefficient of the evaluation circuit; and f=a fifth predeterminate device coefficient of the evaluation circuit.

48. The smoke detector as defined in claim 47, wherein:

said evaluation circuit is constructed such that at least one of said predeterminate device coefficients a, b, d, e and f is gradually adjustable.

49. The smoke detector as defined in claim 2, wherein:

said evaluation circuit is constructed such that in addition there is formed the magnitude:

$$H = h\frac{I_R}{I_{RV}},$$

wherein:

H=a parameter dependent upon the type of smoke present; and h=a third predeterminate device coefficient of the evaluation circuit.

50. The smoke detector as defined in claim 49, wherein:

said evaluation circuit is constructed such that at least one of said predeterminate device coefficients a, b and h is gradually adjustable.

51. The smoke detector as defined in claim 47, wherein:

said evaluation circuit comprises circuit means for forming a mean value of said output signal; and said evaluation circuit is constructed for comparing said output signal to said mean value thereof.

52. The smoke detector as defined in claim 49, wherein:

said evaluation circuit comprises circuit means for forming a mean value of said output signal; and said evaluation circuit is constructed for comparing said output signal to said mean value thereof.

53. The smoke detector as defined in claim 45 or 46, wherein:

said circuit being constructed so that there is additionally formed the time-differentiated quotient dC/dt or dD/dt of the respective output signal C or D.

54. The smoke detector as defined in claim 1, wherein:

said two radiation transmitters are mutually adjacently arranged in the direction of the radiation; and a bifocal Fresnel lens being provided for imaging the radiation of said two radiation transmitters onto the same image spot.

55. The smoke detector as defined in claim 3, wherein:

said evaluation circuit is structured such that at an alarm point said output signal lies between 0.01a and 0.2a, wherein a and b are selected such that $a(I_R/I_{RV})=1$ and $b(I_G/I_{GV})=1$, when no smoke is present in said measuring path.

56. The smoke detector as defined in claim 45, wherein:

said evaluation circuit is structured such that at an alarm point said output signal lies between 0.01b and 0.2b, wherein a and b are selected such that $a(I_R/I_{RV})=1$ and $b(I_G/I_{GV})=1$, when no smoke is present in said measuring path.

57. The smoke detector as defined in claim 46, wherein:

said evaluation circuit is structured such that at an alarm point said output signal lies between 0.005a and 0.la, wherein a and b are selected such that $a(I_R/I_{RV})=1$ and $b(I_G/I_{GV})=1$, when no smoke is present in said measuring path.

58. The smoke detector as defined in claim 45 or 46, wherein:

the evaluation circuit contains predetermined circuit components connected to said comparison radiation receiver and selected such that in the absence of smoke in said measuring path said output signal is essentially zero.

* * * * *

UNITED STATES PATENT AND TRADEMARK OFFICE
CERTIFICATE OF CORRECTION

PATENT NO. : 4,547,675

DATED : October 15, 1985

INVENTOR(S) : JüRG MUGGLI et al

It is certified that error appears in the above—identified patent and that said Letters Patent is hereby corrected as shown below:

Column 8, line 15, please delete "long" and insert --longer--

Column 9, line 10, please delete "alonger" and insert --a longer--

Column 9, line 44, please delete "meausring" and insert --measuring--

Column 10, line 20, please delete "predetermined" and insert --predeterminate--

Column 10, line 34, please delete "means" and insert --mean--

Column 10, line 40, please delete "means" and insert --mean--

Column 10, line 46, please delete "means" and insert --mean--

Column 14, line 11, after "from" please insert --said--

Signed and Sealed this

*Seventh* Day of *January 1986*

[SEAL]

*Attest:*

DONALD J. QUIGG

*Attesting Officer* *Commissioner of Patents and Trademarks*